United States Patent
Marsillach et al.

(10) Patent No.: US 12,280,798 B2
(45) Date of Patent: Apr. 22, 2025

(54) SYSTEM AND METHOD FOR TRAJECTORY PLANNING

(71) Applicant: GM Global Technology Operations LLC, Detroit, MI (US)

(72) Inventors: Daniel Aguilar Marsillach, Detroit, MI (US); Sayyed Rouhollah Jafari Tafti, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 266 days.

(21) Appl. No.: 18/153,623

(22) Filed: Jan. 12, 2023

(65) Prior Publication Data

US 2024/0239373 A1 Jul. 18, 2024

(51) Int. Cl.
*B60W 60/00* (2020.01)
*G05D 1/00* (2024.01)

(52) U.S. Cl.
CPC ....... *B60W 60/0011* (2020.02); *G05D 1/0088* (2013.01); *G05D 1/0212* (2013.01); *G05D 1/0238* (2013.01); *B60W 2554/4045* (2020.02)

(58) Field of Classification Search
CPC ...... B60W 60/0011; B60W 2554/4045; G05D 1/0088; G05D 1/0212; G05D 1/0238
See application file for complete search history.

(56) References Cited

U.S. PATENT DOCUMENTS

| | | | |
|---|---|---|---|
| 11,126,180 B1* | 9/2021 | Kobilarov | B60W 30/18163 |
| 11,513,519 B1* | 11/2022 | Akella | G05D 1/0276 |
| 11,741,709 B2* | 8/2023 | Korjus | G06V 20/10 |
| | | | 382/104 |
| 11,810,365 B1* | 11/2023 | Crego | G06V 20/58 |
| 11,951,975 B1* | 4/2024 | Luders | G08G 1/167 |
| 2020/0192365 A1* | 6/2020 | Russell | B60W 30/0956 |
| 2020/0225669 A1* | 7/2020 | Silva | G01S 17/06 |
| 2020/0225672 A1* | 7/2020 | Silva | G06F 16/29 |
| 2021/0046924 A1* | 2/2021 | Caldwell | G08G 1/166 |
| 2021/0061269 A1* | 3/2021 | Petroff | B60W 40/04 |
| 2021/0271249 A1* | 9/2021 | Kobashi | B60W 60/00272 |
| 2022/0185267 A1* | 6/2022 | Beller | B60W 30/0956 |
| 2023/0143805 A1* | 5/2023 | Baba | G08G 1/16 |
| | | | 701/301 |
| 2024/0101106 A1* | 3/2024 | Blandizzi | B60W 60/00274 |

(Continued)

*Primary Examiner* — Jason Holloway
*Assistant Examiner* — Blake A Wood
(74) *Attorney, Agent, or Firm* — Vivacqua Crane, PLLC (57) ABSTRACT

A system and method for trajectory planning selects a trajectory from a plurality of candidate trajectories to direct an autonomous vehicle. The system includes a controller in communication with a global positioning system (GPS) and at least one sensor. The GPS receives a plurality of global scene information. The at least one sensor collects local scene information. The controller is programmed to receive global scene information and local scene information, identify the location of the occluding obstacle. Additionally, the controller is programmed to determine an occluded portion of the roadway, identify a location of the scene actors on the roadway, and calculate a contracted occluded portion within the occluded portion. Furthermore, the system generates candidate trajectories for the autonomous vehicle to travel along, score the candidate trajectories, and select one of the candidate trajectories based on the assigned score.

20 Claims, 5 Drawing Sheets

(56) References Cited

U.S. PATENT DOCUMENTS

| | | | |
|---|---|---|---|
| 2024/0103522 A1* | 3/2024 | Djuric | G06V 20/56 |
| 2024/0124028 A1* | 4/2024 | Djuric | B60W 60/0027 |
| 2024/0190425 A1* | 6/2024 | Sano | B60W 30/09 |

* cited by examiner

SYSTEM AND METHOD FOR TRAJECTORY PLANNING

INTRODUCTION

The present disclosure relates to autonomous vehicle trajectory planning system and methods and more particularly to a trajectory planning system and method that determine an optimal trajectory of an autonomous vehicle based on a location of an occluded portion of a roadway produced by an occluding obstacle.

Autonomous vehicles (AVs) may drive from a starting point to a predetermined destination with limited or no human intervention using various in-vehicle technologies and sensors. To reach the target designation with limited or no human interaction, an AV may execute various planning tasks such as mission planning or behavior planning. In general, a mission planner determines a trajectory or route based on an ego vehicle's start position to an end position. A behavior planner focuses on handling moving obstacles and static objects while following any stipulated road rules as the vehicle progresses along the prescribed route determined by the mission planner.

Currently, planning approaches for autonomous vehicles may be computationally demanding or inefficient when required to run at a high, fixed rate. What is more, uncertainty as to the scene around the autonomous vehicle stemming from occlusions may increase the computational resource necessary for planning the most appropriate trajectory.

Thus, while current planning approaches achieve their intended purpose, there is a need for a new and improved planning approach which is less computationally demanding and is able to scale into more complex or chaotic driving environments. The new planning approach should also be more robust when encountering occluded portions having occlusions.

SUMMARY

According to several aspects of the present disclosure, a trajectory planning system for selecting a trajectory from a plurality of possible candidate trajectories to direct an autonomous vehicle is provided. The system includes a global positioning system (GPS) for receiving a plurality of global scene information. The plurality of global scene information includes a location of the roadway, and a location of each of a plurality of obstacles along the roadway. Additionally, the system includes at least one sensor disposed on the autonomous vehicle and configured to collect information related to a plurality of local scene information. The plurality of local scene information includes at least one occluding obstacle and a plurality of scene actors. Moreover, the system includes a controller in electrical communication with the at least one sensor and the GPS. The controller is programmed to receive the plurality of global scene information from the GPS and the plurality of local scene information from the at least one sensor. Additionally, the controller is programmed to identify the location of the at least one occluding obstacle based on the plurality of local scene information received from the at least one sensor. The at least one occluding obstacle has a plurality of parameters. Additionally, the controller is programmed to determine an occluded portion of the roadway based on the parameters of the at least one occluding obstacle. Moreover, the controller is programmed to identify a location of each of the plurality of scene actors on the roadway. The first of the plurality of the scene actors is a leading scene actor and a second of the plurality of scene actors is a lagging scene actor. Additionally, the controller is programmed to determine a first travel distance of the leading scene actor. The first travel distance is measured from the location of leading scene actor into the occluded portion. Moreover, the controller is programmed to determine a second travel distance for the lagging scene actor. The second travel distance is measured from the location of the lagging scene actor into the occluded portion. Additionally, the controller is programmed to calculate a contracted occluded portion disposed within the occluded portion based on the first and second travel distances corresponding to the leading and lagging scene actors. Lastly, the controller is programmed to generate the plurality of candidate trajectories for the autonomous vehicle to travel on the roadway based on the global and local scene information and the location of the contracted occluded portion on the roadway.

In an additional aspect of the present disclosure, the controller is programmed to analyze the local scene information to determine whether the location of one of the plurality of obstacles is between the autonomous vehicle and the roadway.

In an additional aspect of the present disclosure, the controller is programmed to determine a length of the occluded portion of the roadway based on the parameters of the at least one occluding obstacle. The parameters include a size of the occluding obstacle, and the size of the occluding obstacle defines the length of the occluded portion of the roadway.

In an additional aspect of the present disclosure, the controller is programmed to identify that the leading scene actor is adjacent a first end of the occluded portion and that the lagging scene actor is adjacent a second end of the occluded portion.

In an additional aspect of the present disclosure, the controller is programmed to determine that the first travel distance is a distance approximately equal to a car length behind the leading scene actor into the occluded portion.

In an additional aspect of the present disclosure, the controller is programmed to determine that the second travel distance is a distance approximately equal to a car length in front of the lagging scene actor into the occluded portion.

In an additional aspect of the present disclosure, the controller is programmed to determine that the contracted occluded portion has a first end and a second end. The first end of the contracted occluded portion is defined by the first travel distance of the leading scene actor and the second end of the contracted occluded portion is defined by the second travel distance of the lagging scene actor.

In an additional aspect of the present disclosure, the controller is programmed to determine whether one of the plurality of candidate trajectories intersects the contracted occluded portion and score the plurality of candidate trajectories. An assigned score of the one of the plurality of candidate trajectories is one that intersects the contracted occluded portion is a first score and another of the plurality of candidate trajectories that does not intersect the occluded portion is assigned a second score.

In an additional aspect of the present disclosure, the controller is programmed to determine that one of the plurality of candidate trajectories that intersects the contracted occluded portion is assigned the first score that is lower than the second score in response to determining that the one of the plurality of candidate trajectories intersects the contracted occluded portion and the other of the plurality of candidate trajectories does not intersect the occluded portion.

In an additional aspect of the present disclosure, the controller is further programmed to select one of the plurality of candidate trajectories based on the assigned score.

According to several aspects of the present disclosure, a trajectory planning method for selecting a trajectory from a plurality of candidate trajectories to direct an autonomous vehicle. The trajectory planning method includes receiving a plurality of global scene information from a global positioning system (GPS). The plurality of global scene information includes a location of the roadway, and a location of each of a plurality of obstacles along the roadway and receiving a plurality of local scene information from at least one sensor disposed on the autonomous vehicle. The method also includes identifying the location of the at least one occluding obstacle based on the plurality of local scene information received from at least one sensor disposed on the autonomous vehicle. The plurality of local scene information includes at least one occluding obstacle and a plurality of scene actors. The at least one occluding obstacle has a plurality of parameters. Additionally, the method includes determining an occluded portion of the roadway based on the parameters of the at least one occluding obstacle. Moreover, the method includes identifying a location of each of the plurality of scene actors on the roadway. A first of the plurality of the scene actors is a leading scene actor and a second of the plurality of scene actors is a lagging scene actor. Additionally, the method includes determining a first travel distance of the leading scene actor. The first travel distance is measured from the location of leading scene actor into the occluded portion. Moreover, the method includes determining a second travel distance for the lagging scene actor. The second travel distance is measured from the location of the lagging scene actor into the occluded portion. Additionally, the method includes calculating a contracted occluded portion disposed within the occluded portion based on the first and second travel distances corresponding to the leading and lagging scene actors. Lastly, the method includes generating the plurality of candidate trajectories for the autonomous vehicle to travel on the roadway based on the global and local scene information and the location of the contracted occluded portion on the roadway.

In an additional aspect of the present disclosure, the method includes analyzing the local scene information to determine whether the location of one of the plurality of obstacles is between the autonomous vehicle and the roadway.

In an additional aspect of the present disclosure, the method includes determining a length of the occluded portion of the roadway based on the parameters of the at least one occluding obstacle wherein the parameters include a size of the occluding obstacle and wherein the size of the occluding obstacle defines the length of the occluded portion of the roadway.

In an additional aspect of the present disclosure, the method includes identifying that the leading scene actor is adjacent a first end of the occluded portion and that the lagging scene actor is adjacent a second end of the occluded portion.

In an additional aspect of the present disclosure, the method includes determining that the first travel distance is a distance approximately equal to a car length behind the leading scene actor and extending into the occluded portion.

In an additional aspect of the present disclosure, the method includes determining that the second travel distance is a distance approximately equal to a car length in front of the lagging scene actor and extending into the occluded portion.

In an additional aspect of the present disclosure, the method includes determining that the contracted occluded portion has a first end and a second end. The first end of the contracted occluded portion is defined by the first travel distance of the leading scene actor and the second end of the contracted occluded portion is defined by the second travel distance of the lagging scene actor.

In an additional aspect of the present disclosure, the method includes determining whether one of the plurality of candidate trajectories intersects the contracted occluded portion and scoring the plurality of candidate trajectories. An assigned score of the one of the plurality of candidate trajectories that intersects the contracted occluded portion is a first score and another of the plurality of candidate trajectories that does not intersect the occluded portion is assigned a second score.

In an additional aspect of the present disclosure, the method includes determining that the one of the plurality of candidate trajectories that intersects the contracted occluded portion is assigned the first score that is lower than the second score in response to determining that the one of the plurality of candidate trajectories intersects the contracted occluded portion and the other of the plurality of candidate trajectories does not intersect the occluded portion.

In an additional aspect of the present disclosure, the method includes selecting the one of the plurality of candidate trajectories based on the assigned score.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
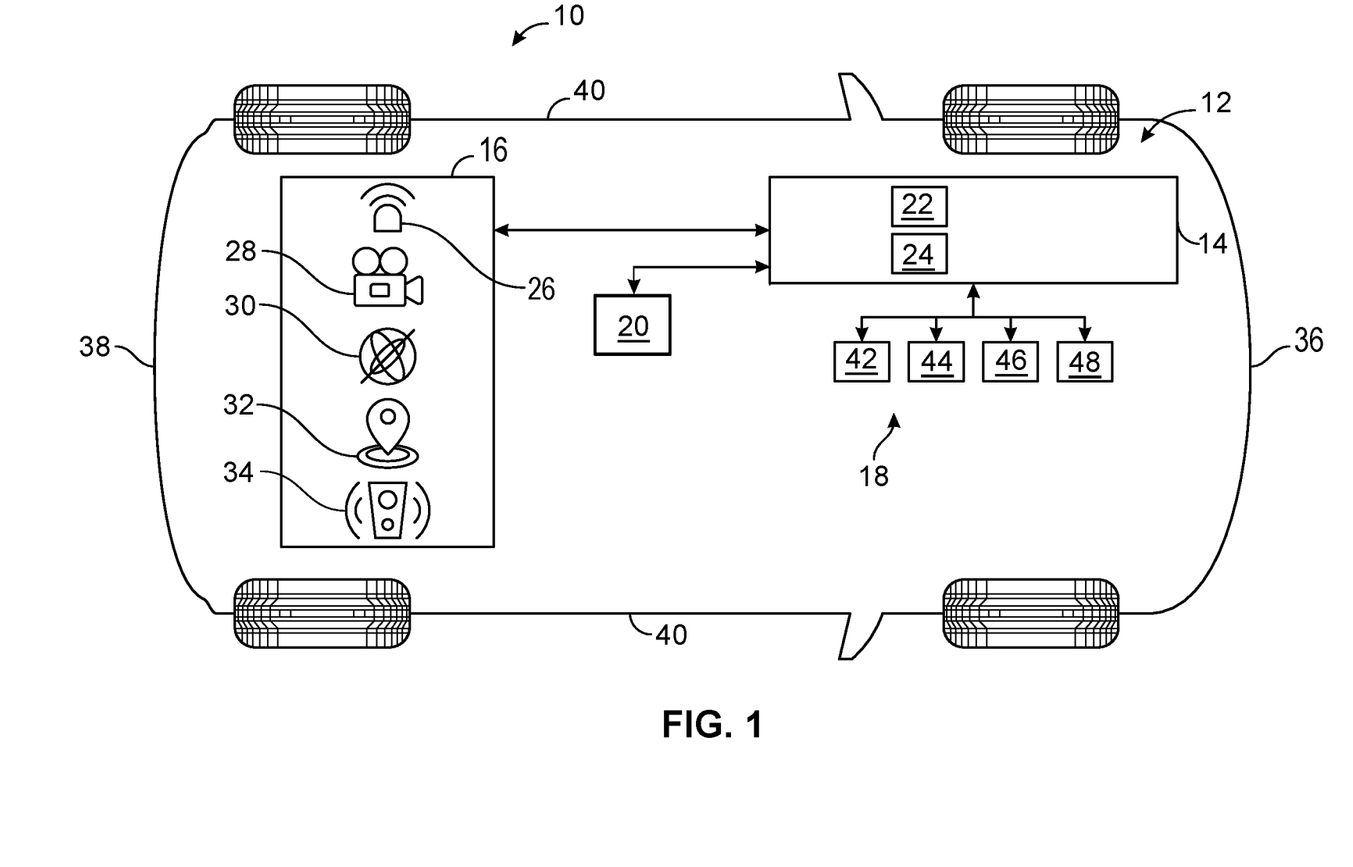
FIG. 1 is a schematic of an autonomous vehicle according to an exemplary embodiment of the present disclosure.

Referring to FIG. 1, an exemplary autonomous vehicle 10 is illustrated. The autonomous vehicle 10 may be any type of vehicle such as, but not limited to, a sedan, truck, sport utility vehicle, van, or motor home. In one non-limiting embodiment, the autonomous vehicle 10 is a fully autonomous vehicle including an automated driving system (ADS) 12 for performing all driving tasks.

The ADS 12 ensures that the autonomous vehicle 10 maneuvers to avoid one or more stationary or moving obstacles. The ADS 12 is configured to minimize the computational power needed in autonomous vehicle applications. This allows the ADS 12, to scale well into busier environments. Given a set of trajectory planning algorithms of varying complexities, the ADS 12 may determine when a light-weight trajectory planning approach is suitable based on an evaluation of the local scene complexity and re-assessment of prior assumptions. Alternatively, the ADS 12 may automatically determine when it is necessary to perform a full trajectory replan by measuring changes to the scene and re-evaluating assumptions. In doing so, the ADS 12 saves energy and computational resources without requiring significant changes to the trajectory planning algorithms. The ADS 12 includes an automated driving controller 14 in electrical communication with a plurality of on-board sensors 16, a plurality of vehicle systems 18, and one or more external vehicle networks 20.

The automated driving controller 14 determines autonomous driving features such as perception, planning, localization, mapping, and control of the autonomous vehicle 10. The automated driving controller 14 includes at least one processor 22 and a non-transitory computer readable storage device or media 24. The processor 22 may be a custom made or commercially available processor, a central processing unit (CPU), a graphics processing unit (GPU), an auxiliary processor among several processors associated with the automated driving controller 14, a semiconductor-based microprocessor (in the form of a microchip or chip set), a macroprocessor, a combination thereof, or generally a device for executing instructions. The computer readable storage device or media 24 may include volatile and non-volatile storage in read-only memory (ROM), random-access memory (RAM), and keep-alive memory (KAM), for example. KAM is a persistent or non-volatile memory that may be used to store various operating variables while the processor 22 is powered down. The computer-readable storage device or media 24 of the automated driving controller 14 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the automated driving controller 14 in controlling the autonomous vehicle 10. The instructions may include one or more separate programs or subroutines, each of which comprises an ordered listing of executable instructions for implementing logical functions. The instructions, when executed by the processor 22, receive and process signals from the plurality of on-board sensors 16, perform logic, calculations, methods and/or algorithms for automatically controlling the components and vehicle systems 18 of the autonomous vehicle 10, and generate control signals to the actuators to automatically control the components and systems 18 of the autonomous vehicle 10 based on the logic, calculations, methods, and/or algorithms. The non-transitory computer readable storage device or media 24 includes machine-readable instructions that when executed by the one or more processors 22, cause the processors 22 to execute the method 100 (shown, for example, in FIG. 2). Although FIG. 1 illustrates the automated driving controller 14 as a single controller, it should be appreciated that the ADS 12 may incorporate multiple controllers as well.

The on-board sensors 16 are configured to monitor data indicative of a dynamic state of the autonomous vehicle 10 and data indicating obstacles located in an environment surrounding the autonomous vehicle 10. In the example as shown in FIG. 1, the on-board sensors 16 include one or more radar sensors 26, one or more cameras 28, an inertial measurement unit (IMU) 30, a global positioning system (GPS) 32, and LiDAR 34, however, it is to be appreciated that additional sensors may be used as well. Each of the on-board sensors 16 performs multiple individual scans of the environment surrounding the autonomous vehicle 10 to obtain data containing local scene information currently in the environment surrounding the autonomous vehicle 10. Specifically, the cameras 28 each detect the local scene information including static and dynamic obstacles within a respective field-of-view (FOV) of vehicle 10. Both the radar 26 and the LiDAR 34 may be used to detect objects and a distance associated with the object, as well as to determine the objects' speed and disposition. However, LiDAR may be used to detect relatively smaller objects, while radar may be used in limited visibility conditions such as cloudy or foggy weather. Both the IMU 30 and the GPS 32 may be used to directly measure a vehicle state. Specifically, the IMU 30 may be used to determine the vehicle state including an angular rotation rate, acceleration, and heading of the autonomous vehicle 10, and the GPS 32 may be used to determine the vehicle state including location, position, velocity of the autonomous vehicle 10. In a non-limiting example, the GPS 32 includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 10 based on the signals received by the GPS receiver antenna. In an exemplary embodiment, the GPS 32 additionally includes a map. The map includes information about infrastructure such as municipality borders, roadways, railways, sidewalks, buildings, and the like. Therefore, the geographical location of the vehicle 10 is contextualized using the map information. In a non-limiting example, the map is retrieved from a remote source using a wireless connection. In another non-limiting example, the map is stored in a database of the GPS 32. It should be understood that various additional types of satellite-based radionavigation systems, such as, for example, Galileo, GLONASS, and the BeiDou Navigation Satellite System (BDS) are within the scope of the present disclosure. The sensors 16 may be mounted to the front 36, the rear 38, and/or the sides 40 of the autonomous vehicle 10 to detect objects in an environment surrounding the autonomous vehicle 10.

The automated driving controller 14 is in electrical communication with the vehicle systems 18 to control and guide the autonomous vehicle 10 along a planned trajectory. The vehicle systems 18 include, but are not limited to, a brake system 42, a steering system 44, a powertrain system 46 and a suspension system 48. The automated driving controller 14 sends vehicle control commands to the vehicle systems 18 to guide the autonomous vehicle 10 along the planned trajectory.

The automated driving controller 14 is also in electrical communication with one or more external vehicle networks 20. The automated driving controller 14 receives information or data from the external vehicle networks 20, such as, vehicle location, location of infrastructure, and the like. The one or more external vehicle networks 20 may include, but are not limited to, cellular networks, dedicated short-range communications (DSRC) networks, vehicle to vehicle (V2V) wireless network communication, or vehicle-to-infrastructure (V2X) wireless networks communications. Exemplary communications include cellular, Bluetooth®, IEEE 802.11, dedicated short-range communications (DSRC), and/or wide area networks (WAN), including the Internet, providing data communication services.

Figure 2:
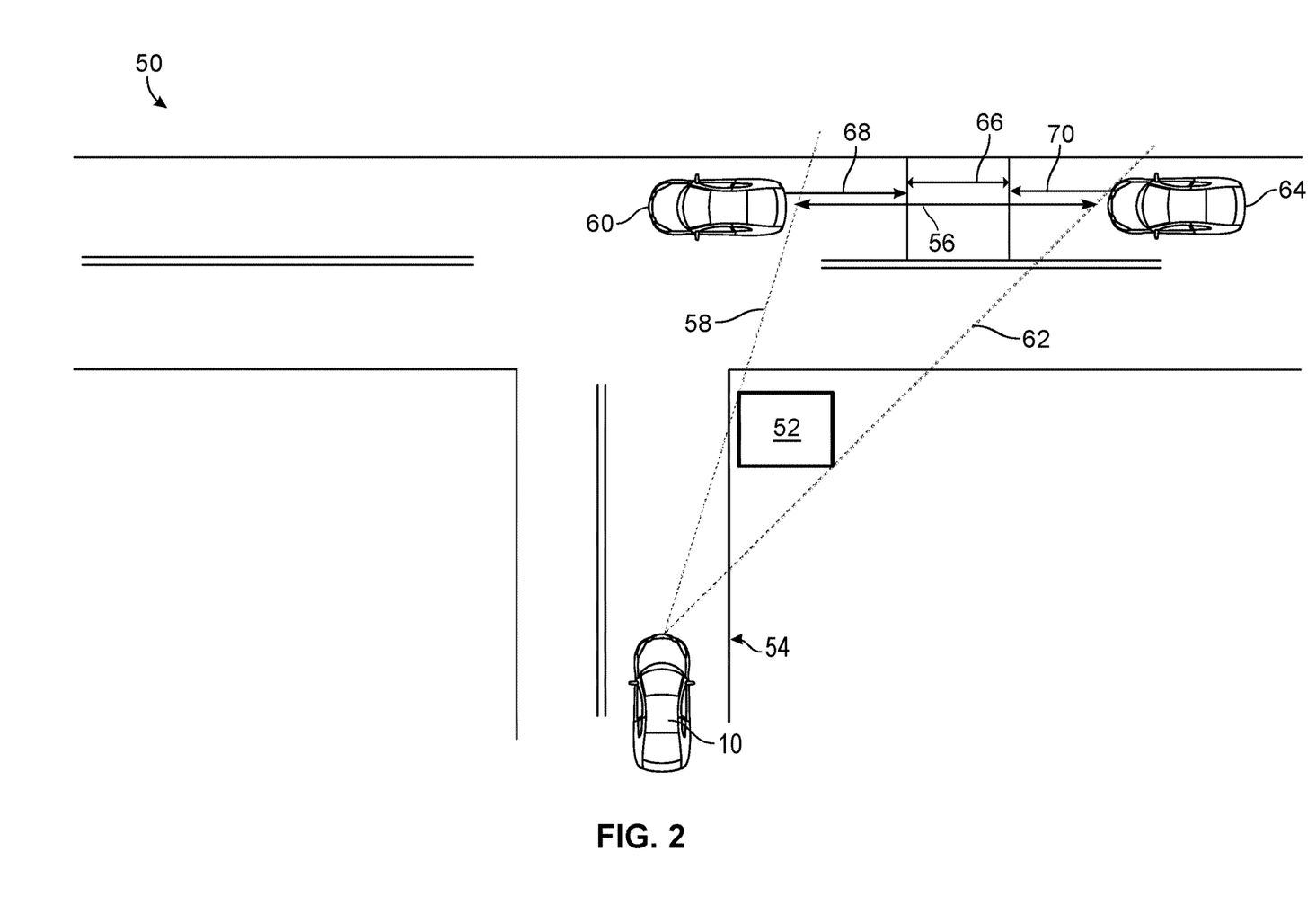
FIG. 2 is a schematic diagram of an exemplary driving scene having an occluding obstacle, according to an exemplary embodiment of the present disclosure.

Referring to FIG. 2, a schematic diagram of an exemplary scene environment 50 in the FOV of autonomous vehicle 10 is illustrated. The scene environment 50 is scanned by the on-board sensors 16 to collect local scene information. The local scene information, for example, is data related to the location of objects currently in the FOV of the autonomous vehicle 10, for example, pedestrians, stationary and moving vehicles (herein referred to as scene actors) and temporary barriers and the like. The scene environment 50 also includes roads and buildings and other stationary objects, referred to herein as global scene information. For example, global scene information is data related to the location of buildings and roadways on a map of the area surrounding the autonomous vehicle 10. Some of the solid objects, such as buildings may be occluding obstacles 52. The occluding obstacles 52 obscures or blocks a portion of the roadway 54, referred to herein as an occluded portion 56 of the roadway 54, from detection by the sensors 16. Some of the scene actors that are present in the local scene information and in the FOV of the autonomous vehicle 10 border the occluded portion 56 of the roadway 54. A scene actor that is adjacent a first end 58 of the occluded portion 56 is referred to herein as the leading scene actor 60, and the scene actor that is adjacent the second end 62 of the occluded portion 56 is referred to herein as the lagging scene actor 64.

The system and method of the present disclosure operates to reduce the size or length of the occluded portion 56. An occluded portion 56 that has been reduced in size or length is referred to herein as a contracted occluded portion 66. As will be described in further detail below, the method of the present disclosure utilizes the position, velocity, and acceleration of the leading and lagging scene actors 60, 64 in the FOV of the autonomous vehicle 10 to reduce the size of the occluded portion 56 to the smaller size or length of the contracted occluded portion 66 by a distance or length d1 and d2. Distance d1 or d2 are referred to herein as travel distance. Travel distance is an assumed distance that is derived from typical traffic rules and proper driving techniques. For example, when a vehicle is following behind another vehicle proper driving technique or traffic rules dictate that the vehicle following behind the other vehicle should maintain a specific distance (i.e., a traveling distance) from the vehicle in front of the following vehicle to ensure the following vehicle does not hit the other vehicle in case of sudden stops and the like. A traveling distance may be, for example, one or two car lengths.

Figure 3:
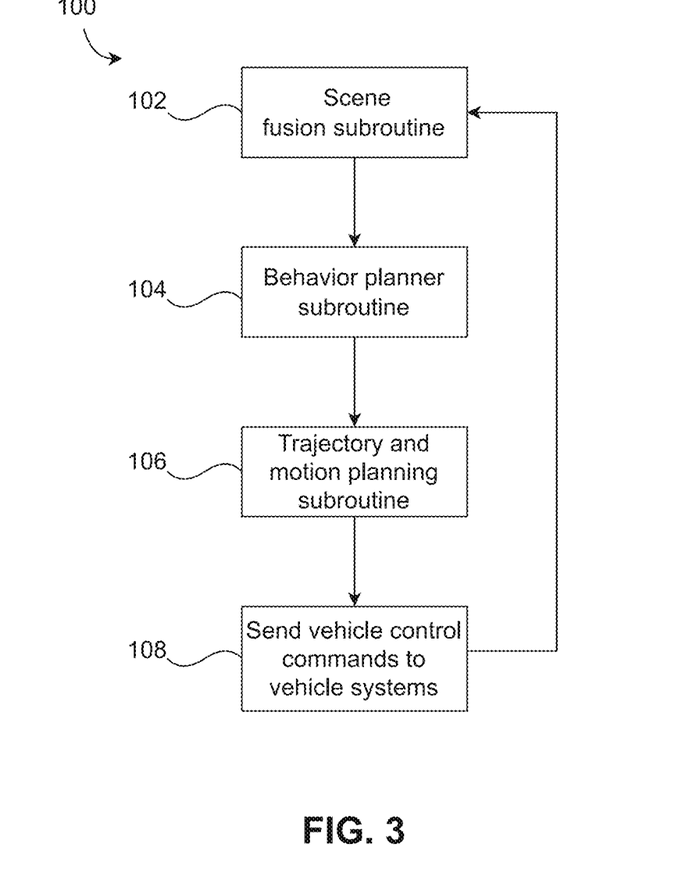
FIG. 3 is a block diagram illustrating the system logic for detecting an occlusion, ranking a trajectory and selecting an optimal trajectory, according to an exemplary embodiment of the present disclosure.

Referring to FIG. 3, the logic for a method 100 for planning and selecting a trajectory for the autonomous vehicle 10 to travel is illustrated as a block diagram. Method 100 for example is stored as executable code in the non-transitory computer readable storage device or media 24 of the automated driving controller 14. Method 100 starts at block 102. The method 100 is comprised of three subroutines, a scene fusion subroutine 102, a behavior planner subroutine 104, and a trajectory and motion planning subroutine 106. At block 102, the method 100 executes the scene fusion subroutine 102 that will be described in greater detail with reference to FIG. 3. Moreover, at block 102, scene fusion subroutine 102 receives global scene information and the local scene information using the on-board sensors 16 to detect occluding obstacles 52 in the FOV of the autonomous vehicle 10. Buildings, for example, may be occluding obstacles 52 that block the FOV of the autonomous vehicle 10 and, more specifically, portions of the roadway 54 on which the autonomous vehicle 10 is travelling. The method 100 then moves to block 104.

At block 104, the method 100 executes the behavior planner subroutine 104 that will be described in greater detail with reference to FIG. 5. The behavior planner subroutine 104 receives the global and local scene information captured by the on-board sensors 16 processed by the scene fusion subroutine 102. Furthermore, a plurality of candidate trajectories for directing the autonomous vehicle 10 on a roadway 54 are generated. The trajectories that intersect the occluded portions 56 of the roadway 54 are identified. The behavior planning subroutine 104 considers all the generated trajectories including the trajectories that intersect the occluded portions 56 of the roadway 54 and selects a trajectory for the autonomous vehicle 10 to follow. The determination of which trajectory to select will be further described with respect to the behavior planner subroutine 104 of FIG. 5. The selected trajectory is provided to block 106.

At block 106, the trajectory and motion planning subroutine 106 receives the selected trajectory from behavior planner subroutine 104. In response, the trajectory and motion planning subroutine of block 106 directs the autonomous driving controller 14, at block 108, to send vehicle control commands to the vehicle systems 18. The vehicle systems 18 provide vehicle motion control to guide the autonomous vehicle 10 along the selected trajectory. The method 100 then returns to block 102 as long as the vehicle 10 is still driving.

Figure 4:
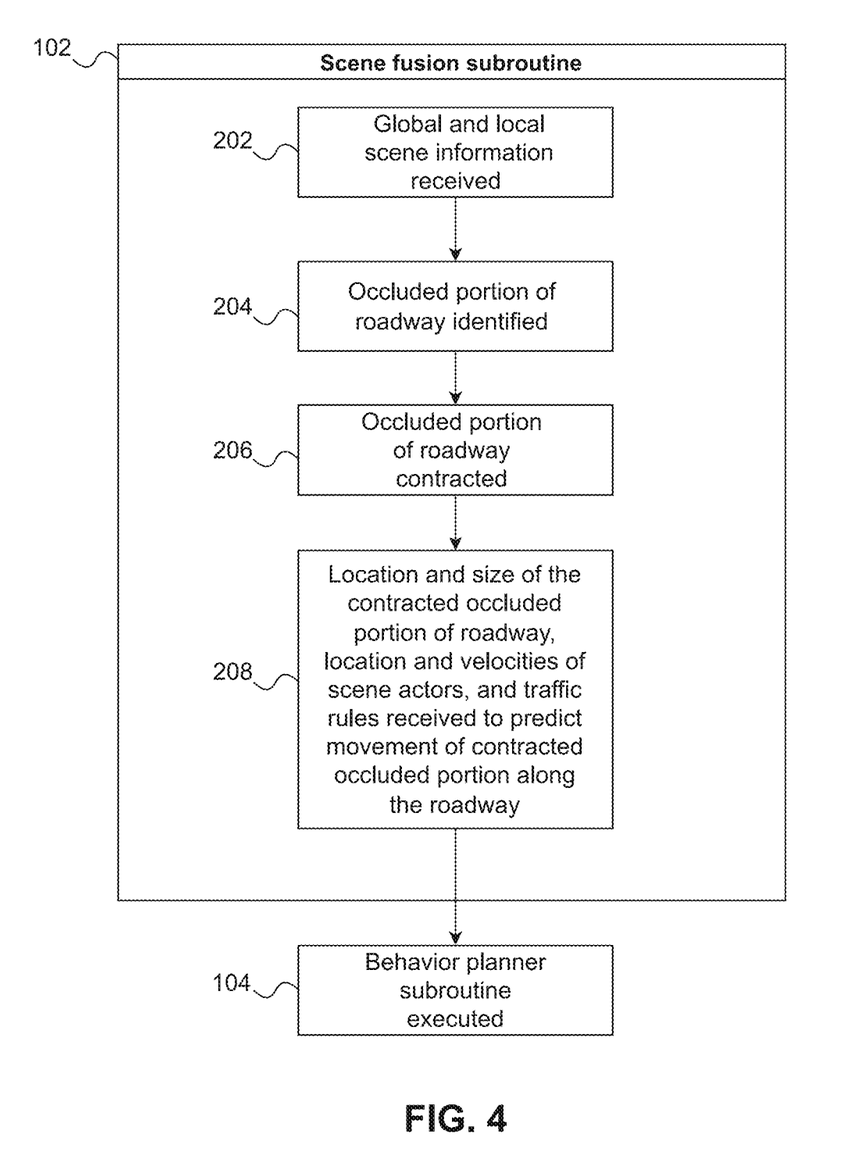
FIG. 4 is a flow chart of a subroutine for contracting an occluded portion according to an exemplary embodiment of the present disclosure.

Referring to FIG. 4, the scene fusion subroutine 102 will now be described below and illustrated in further detail as a block diagram. The scene fusion subroutine 102 begins at block 202. At block 202, global scene information is received in the form of the map from the GPS 32. Additionally, the local scene information is received at block 202, local scene information includes the current scene environment 50 surrounding and in the FOV of the autonomous vehicle 10 and obtained by continuous scanning by the on-board sensors 16. For example, local scene information is the stationary and moving obstacles along the roadway 54 that are currently in the FOV of the vehicle 10. Some of the obstacles 52 along the roadway 54 block or obscure the FOV of vehicle 10 and in some cases block portions of the roadway 54 creating occluded portions 56 of the roadway 54. Other obstacles on the roadway 54 include solid moving objects in the FOV of the vehicle 10 such as other vehicles. These other vehicles are referred to herein as scene actors as previously discussed. Additionally, the scene actors may include bikers, or a pedestrian.

The occluding obstacles 52 have parameters such as size, distance from the vehicle 10, and location on the roadway 54. These parameters define the occluded portion 56 of the roadway 54. In other words, the size of the occluding obstacle (i.e., a building) 52 and the distance from the vehicle 10 and the roadway 54 create a particular area of the roadway 54 that is occluded or blocked from the FOV of the vehicle 10. After the occluding obstacles 52 are detected in the FOV of the autonomous vehicle 10 by the on-board sensors 16 the subroutine 102 moves to block 204.

At block 204, the occluded portion 56 of the roadway 54 is identified based on the occluding obstacles 52 in the FOV of the vehicle 10 detected at block 202. More specifically, the occluding obstacle 52 located between the vehicle 10 and the roadway 54 creates an occluded portion 56 of the roadway 54. The occluded portion 56 of the roadway 54 is proportional in size to the parameters of the occluding obstacle 52 such as size of the occluding obstacle 52 and distance the occluding obstacle 52 is from the vehicle 10 and from the roadway 54. For example, the larger the occluding obstacle 52 or building, the larger the occluded portion 56 of the roadway 54 and the closer the vehicle 10 is to the occluding obstacle 52 or building, the larger the occluding portion 56 of the roadway 54 will be. The subroutine 102 then moves to block 206.

At block 206, the occluded portion 56 of the roadway 54 identified at block 204 is reduced in size or contracted. The scene fusion subroutine 102 utilizes the detected obstacles in the FOV of the vehicle 10 such as the scene actors 60, 64 to contract the occluded portion 56 of the roadway 54. More specifically, the scene actors 60, 64 that are determined to be adjacent the occluded portion 56 of the roadway 54 are used to contract the size of the occluded portion 56. Moreover, the scene actor or vehicle ahead or in front of a first end 58 of the occluded portion 56 is identified and referred to herein as the leading scene actor 60 and the scene actor or vehicle behind or in back of the second end 62 of the occluded portion 56 is identified and referred to herein as a lagging scene actor 64. The leading scene actor 60 that is adjacent the first end 58 of the occluded portion 56 is visible to the on-board sensors 16 and the lagging scene actor 64 that is adjacent the second end 62 of the occluded portion 56 is also visible to the on-board sensors 16. The leading scene actor 60 is presumed to be ahead of a vehicle in the occluded portion 56 by a predefined travel distance herein referred to as the first travel distance d1 or 68 and the lagging scene actor 64 is presumed to be behind the same vehicle or another vehicle in the occluded portion 56 by a predefined travel distance herein referred to as the second travel distance d2 or 70. Thus, the size or length of the occluded portion 56 is reduced or contracted in size or length by an amount equal to the first and second travel distances 68, 70. The first and second travel distances 68, 70 may be pre-defined using traffic rules (i.e., proper following distance from a vehicle is one or two car lengths). The subroutine 102 then moves to block 208.

At block 208, scene fusion subroutine 102 receives as inputs the location and size of the contracted occluded portion 66 from block 206, the location and velocities of the leading and lagging scene actors 60, 64, and traffic rules (i.e., lights and signs) to predict the movement of the contracted occluded portion 66 along the roadway 54. More specifically, scene fusion subroutine 102 uses reachability theory and a reach set $R_{k+1}$ at a time index $t_{k+1}$ is defined and comprised of the predicted lateral and longitudinal positions and velocities of the contracted occluded portion 66 along the roadway 54. Separately, the positions, velocities, and accelerations of the leading and lagging scene actors 60, 64 are predicted and utilized to sequentially contract the predicted contracted occluded portions The resulting corridor represents a prediction of the movement of the contracted occluded portion 66 along the roadway 54 while accounting for the travel distances varying over time. The reach set $R_{k+1}$ is used to predict the movement of the contracted occluded portion 66 and a separate prediction is performed for the leading and lagging scene actors 60, 64 along the roadway 54, which does impact the reach set $R_{k+1}$. An assumption is made that a critical distance $d_1$ or $d_2$ (i.e., the travel distance) is maintained between the leading and lagging scene actors 60, 64 and the contracted occluded portion 66. At $t_{k+1}$ a determination is made whether the leading or lagging scene actors 60, 64 (referenced as $a_i$) are in front or behind the reach set or contracted occluded portion 66. The position and velocity of the leading or lagging scene actors 60, 64 are given by $x_{k+1}^{ai}$. If the leading or lagging scene actors 60, 64 are within the critical distance $d_1$ or $d_2$ of occluded portion 56 the size of the occluded portion 56 is reduced so that the distance between the leading or lagging scene actors 60, 64 and the contracted occluded portion 66 is at least $d_1$ or $d_2$. The subroutine 102 then concludes.

Figure 5:
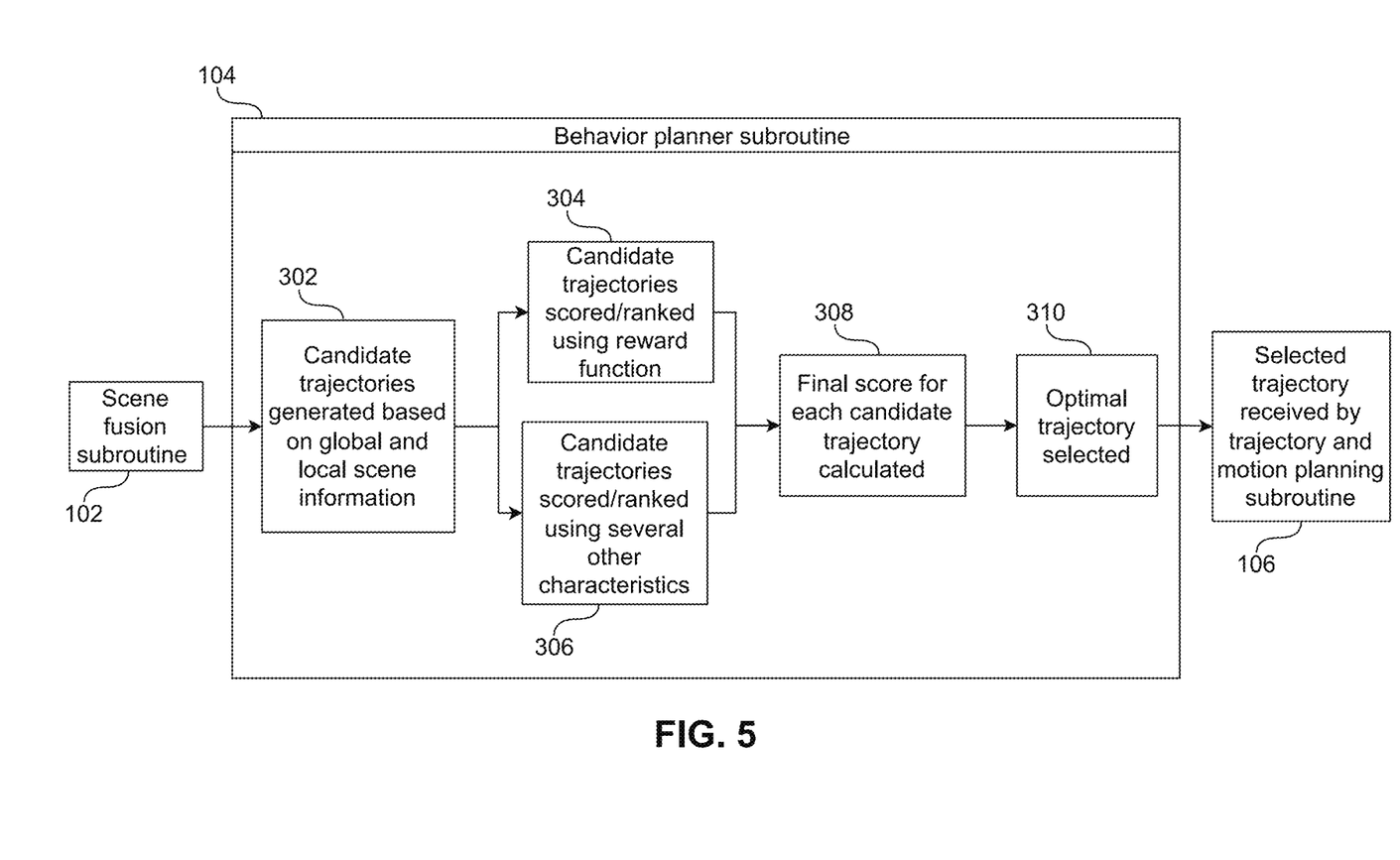
FIG. 5 is a flow chart of a subroutine for selecting an optimal trajectory using a reward function according to an exemplary embodiment of the present disclosure.

Referring to FIG. 5, the behavior planner subroutine 104 is illustrated as a block diagram. The behavior planner subroutine 104 begins at block 302. At block 302, the subroutine 104 generates candidate trajectories based on the global scene information and local scene information. The candidate trajectories are generated at each traffic junction along a predetermined route in order to guide the vehicle 10 along the roadway 54 to reach a final destination. The candidate trajectories may vary in speed, angle, path, and timing. Moreover, the candidate trajectories vary according to the vehicle 10 location on the roadway 54 relative to a traffic junction. Traffic junctions are locations at which the ADS 12 will need to determine an optimal trajectory in order to proceed along the predetermined route to reach the final destination. Examples of traffic junctions include intersections, roundabouts, on-ramps, off-ramps, or driveways. In the current embodiment, the vehicle 10 is traveling along a predetermined route. The predetermined route is a route that the vehicle 10 has been programmed to follow in order to reach an occupant's desired final destination. The predetermined route is typically selected by the GPS 32 and can be adjusted depending on traffic patterns or the local scene information. The predetermined route is likely to contain several traffic junctions that will require the ADS 12 to generate a plurality of candidate trajectories to navigate the occupant's desired final location. In the current example, the pre-determined requires that the vehicle 10 executes a left turn at a three-way intersection along the roadway 54. The subroutine 104 then continues to blocks 304 and 306.

At block 304, the behavior planner subroutine 104 scores or ranks the candidate trajectories using a reward function (shown below). The reward function penalizes the candidate trajectories that intersect with the contracted occluded portion 66 at a future time. To determine whether the vehicle 10 traveling along a selected candidate trajectory will intersect with the contracted occluded portion 66 at a future time, the behavior planner subroutine utilizes reachability theory. Reachability theory considers a projection of the vehicle 10 position along the selected candidate trajectory at a selected future time, $t_k$, in tandem with the projection of the contracted occluded portion (i.e., occupancy set) 66 at the same selected future time, $t_k$, to determine whether the projection of the vehicle 10 will intersect with the projection of the contracted occluded portion 66 at a selected future time. The process is repeated at a time $t_{k+1}$ to $t_{k+N}$; given these predictions/projections, a routine is called that determines whether the projection of vehicle 10 will intersect with the projection of the contracted occluded portion 66. The projection of the vehicle 10 traveling along the selected candidate trajectory is an extrapolation of a future position of the vehicle 10 at a time $t_k$, $t_{k+1}$, or $t_{k+N}$. The projection of the contracted occluded portion 66 is an extrapolation of a future position of the contracted occluded portion 66 at a time $t_k$, $t_{k+1}$, or $t_{k+N}$. After completing the reachability theory analysis, the behavior planner subroutine 104 determines the whether the selected candidate trajectory will be penalized using the reward function. The reward function is exemplified as follows in equation (1):

$$R_{occ.}(s, a) = \begin{cases} w, & \text{if } a(\tau_j) \in O_j \\ 0, & \text{if } a(\tau_j) \notin O_j \end{cases}, j = k, \ldots, k+N \quad (1)$$

Where $R_{occ.}$ represents the output reward component related to the contracted occluded portion 66, s represents the state or position of the vehicle 10 (i.e., the lateral and longitudinal position, velocity, and acceleration on the roadway 54), $a(\tau_j)$ represents the candidate trajectory evaluated at the time $\tau_j$ between when the contracted occluded portion 66 was determined at time $t_k$ and when the projection of the contracted occluded portion 66 is being analyzed at $t_j > t_k$, and where w represents a static penalty constant. In the example reward function above, the behavior planner subroutine 104 determines whether the vehicle 10 traveling along the candidate trajectory will intersect with the contracted occluded portion 66 at a future time. If the candidate trajectory intersects with the contracted occluded portion 66 at a future time, then w is assigned a number less than 0, and a static penalty will be a negative number, thus negatively impacting the final output. If the candidate trajectory does not intersect with the contracted occluded portion 66 at a future time, then w is 0, and no penalty will be added to the final output. An alternate reward function is exemplified as follows in equation (2):

$$R_{occ}(s, a) = \begin{cases} w\left(\dfrac{-1}{1 + e^{-(\alpha(\tau_j) - t_H)}}\right), & \text{if } a(\tau_j) \in O_j \\ 0, & \text{if } a(\tau_j) \notin O_j \end{cases}, j = k, \ldots, k+N \quad (2)$$

Where $R_{occ.}$ represents the output reward component related to the contracted occluded portion 66, s represents the state or position of the vehicle 10 (i.e., the lateral and longitudinal position, velocity, and acceleration on the roadway 54), $a(\tau_j)$ represents the candidate trajectory evaluated at the time $\tau_j$ between when the contracted occluded portion 66 was determined at time $t_k$ and when the projection of the contracted occluded portion 66 is being analyzed at $t_j > t_k$, W represents a static penalty constant, $\alpha$ represents a tunable hyperparameter which modifies a reward plot, and $\tau_j$ equals and $t_j - t_k$ represents the elapsed time between real time $t_k$ and future time $t_j$, and $t_H$ represents a safety horizon used to add a temporal component to the reward, such as the time required to stop or slow the vehicle 10. In this embodiment, the reward function is also dependent on time and does not output a static penalty. Instead, the alternate embodiment outputs a reward plot which is a graph of the position of the contracted occluded portion 66. If the position of the vehicle 10 following the candidate trajectory intersects with the position of the contracted occluded portion 66 on the reward plot, then a penalty is applied. In both embodiments the candidate trajectory is penalized for intersecting with the contracted occluded portion 66. While the behavior planner subroutine 104 is calculating whether the selected candidate trajectory will intersect with the contracted occluded portion 66 using the reward function, the behavior planner subroutine 104 is simultaneously calculating the reward component of the selected candidate trajectory in block 306.

At block 306, behavior planner subroutine 104 scores or ranks all of the candidate trajectories by analyzing several other characteristics of the candidate trajectories. The behavior planner subroutine 104 will award points to or give the trajectories a higher score or ranking that contains positive characteristics. Positive characteristics are characteristics of a candidate trajectory which the occupant of the vehicle 10 would find desirable for physical or emotional comfort. In the present embodiment, positive characteristics are fuel efficiency, occupant comfort, travel time, and safety rating. The subroutine 104 then proceeds to block 308.

At block 308, behavior planner subroutine 104 calculates a final score for each of the candidate trajectories. The final score or rank is a sum of the points penalized in block 304 and the points awarded in block 306. The final score is represented by the function in equation 3:

$$\tilde{R} = R_{occ} + R_n \quad (3)$$

Where $\tilde{R}$ represents the net reward score of the selected candidate trajectory in block 308, and $R_{occ}$ represents the output reward component related to the contracted occluded portion 66 generated in block 304, and $R_n$ represents the points awarded in block 306. The behavior planner subroutine 104 then moves to block 310.

At block 310, behavior planner subroutine 104 selects an optimal trajectory. The optimal trajectory is the trajectory that has the largest $\tilde{R}$ value. The subroutine 104 then selects the trajectory from the plurality of candidate trajectories with the largest $\tilde{R}$ value. The trajectory is then sent to the ADS 12 and the behavior planner subroutine 104 concludes.

The system and method for trajectory planning of the present disclosure offers several advantages. These include a reduction in the need for computational power by the system, and the ability scale into higher traffic areas that may contain more occluding obstacles, scene actors, or roadway lanes.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations. "Local scene information" is the best estimate of the scene at the current time, given all inputs (e.g., perception) available from the past up to a current time. The current driving scene may be expressed in either ego-frame (i.e., relative to the ego vehicle) or in some other frame (e.g., global/world frame, using latitude and longitude coordinates). "Projected contracted occluded portion" is the best estimate of the contracted occluded portion 66 at some time in the past, given all inputs available up to time, then predicted forward. The prediction step involves potentially updating the local scene information (if the scene is in ego-frame) and the positions of other vehicles in the scene.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A trajectory planning system for selecting a trajectory from a plurality of candidate trajectories to direct an autonomous vehicle, the trajectory planning system comprising:
   a global positioning system (GPS) for receiving a plurality of global scene information, wherein the plurality of global scene information includes a location of a roadway, and a location of each of a plurality of obstacles along the roadway;
   at least one sensor disposed on the autonomous vehicle and configured to collect information related to a plurality of local scene information, wherein the plurality of local scene information includes at least one occluding obstacle and a plurality of scene actors; and
   a controller in electrical communication with the at least one sensor and the GPS, wherein the controller is programmed to:
      receive the plurality of global scene information from the GPS and the plurality of local scene information from the at least one sensor;
      identify the location of the at least one occluding obstacle based on the plurality of local scene information received from the at least one sensor, wherein the at least one occluding obstacle has a plurality of parameters;
      determine an occluded portion of the roadway based on the parameters of the at least one occluding obstacle;
      identify a location of each of the plurality of scene actors on the roadway, wherein a first of the plurality of the scene actors is a leading scene actor and a second of the plurality of scene actors is a lagging scene actor;
      determine a first travel distance of the leading scene actor, wherein the first travel distance is measured from the location of the leading scene actor into the occluded portion;
      determine a second travel distance for the lagging scene actor, wherein the second travel distance is measured from the location of the lagging scene actor into the occluded portion;
      calculate a contracted occluded portion disposed within the occluded portion based on the first and second travel distances corresponding to the leading and lagging scene actors; and
      generate the plurality of candidate trajectories for the autonomous vehicle to travel on the roadway based on the global and local scene information and the location of the contracted occluded portion on the roadway.

2. The system of claim 1, wherein the controller programmed to identify the location of the at least one occluding obstacle further includes analyzing the local scene information to determine whether the location of one of the plurality of obstacles is between the autonomous vehicle and the roadway.

3. The system of claim 1, wherein the controller programmed to determine an occluded portion of the roadway based on the parameters of the at least one occluding obstacle further includes determining a length of the occluded portion of the roadway based on the parameters of the at least one occluding obstacle wherein the parameters include a size of the occluding obstacle and wherein the size of the occluding obstacle defines the length of the occluded portion of the roadway.

4. The system of claim 1, wherein the controller programmed to identify a location of each of the plurality of scene actors on the roadway further includes identifying that the leading scene actor is adjacent a first end of the occluded portion and that the lagging scene actor is adjacent a second end of the occluded portion.

5. The system of claim 4, wherein the controller programmed to determine a first travel distance for the leading scene actor further includes determining that the first travel distance is a distance approximately equal to a car length behind the leading scene actor extending into the occluded portion.

6. The system of claim 5, wherein the controller programmed to determine a second travel distance for the lagging scene actor further includes determining that the second travel distance is a distance approximately equal to a car length in front of the lagging scene actor extending into the occluded portion.

7. The system of claim 1, wherein the controller programmed to calculate a contracted occluded portion disposed within the occluded portion based on the first and second travel distances corresponding to the leading and lagging scene actors further includes determining that the contracted occluded portion has a first end and a second end, wherein the first end of the contracted occluded portion is defined by the first travel distance of the leading scene actor and the second end of the contracted occluded portion is defined by the second travel distance of the lagging scene actor.

8. The system of claim 1, wherein the controller is further programmed to determine whether one of the plurality of candidate trajectories intersects the contracted occluded portion and score the plurality of candidate trajectories, wherein an assigned score of the one of the plurality of candidate trajectories that intersects the contracted occluded portion is a first score and another of the plurality of candidate trajectories that does not intersect the occluded portion is assigned a second score.

9. The system of claim 8, wherein the controller programmed to score the plurality of candidate trajectories further includes determining that the one of the plurality of candidate trajectories that intersects the contracted occluded portion is assigned the first score that is lower than the second score in response to determining that the one of the plurality of candidate trajectories intersects the contracted occluded portion and the other of the plurality of candidate trajectories does not intersect the occluded portion.

10. The system of claim 9, wherein the controller is further programmed to select one of the plurality of candidate trajectories based on the assigned score.

11. A trajectory planning method for selecting a trajectory from a plurality of candidate trajectories to direct an autonomous vehicle, the trajectory planning method comprising:
receiving a plurality of global scene information from a global positioning system (GPS), wherein the plurality of global scene information includes a location of a roadway, and a location of each of a plurality of obstacles along the roadway;
receiving a plurality of local scene information from at least one sensor;
identifying the location of at least one occluding obstacle based on the plurality of local scene information received from the at least one sensor disposed on the autonomous vehicle, wherein the plurality of local scene information includes at least one occluding obstacle and a plurality of scene actors, wherein the at least one occluding obstacle has a plurality of parameters;
determining an occluded portion of the roadway based on the parameters of the at least one occluding obstacle;
identifying a location of each of the plurality of scene actors on the roadway, wherein a first of the plurality of the scene actors is a leading scene actor and a second of the plurality of scene actors is a lagging scene actor;
determining a first travel distance of the leading scene actor, wherein the first travel distance is measured from the location of the leading scene actor into the occluded portion;
determining a second travel distance for the lagging scene actor, wherein the second travel distance is measured from the location of the lagging scene actor into the occluded portion;
calculating a contracted occluded portion disposed within the occluded portion based on the first and second travel distances corresponding to the leading and lagging scene actors; and
generating the plurality of candidate trajectories for the autonomous vehicle to travel on the roadway based on the global and local scene information and the location of the contracted occluded portion on the roadway.

12. The method of claim 11, wherein identifying the location of the at least one occluding obstacle further includes analyzing the local scene information to determine whether the location of one of the plurality of obstacles is between the autonomous vehicle and the roadway.

13. The method of claim 11, wherein determining an occluded portion of the roadway based on the parameters of the at least one occluding obstacle further includes determining a length of the occluded portion of the roadway based on the parameters of the at least one occluding obstacle wherein the parameters include a size of the occluding obstacle and wherein the size of the occluding obstacle defines the length of the occluded portion of the roadway.

14. The method of claim 11, wherein identifying a location of each of the plurality of scene actors on the roadway further includes identifying that the leading scene actor is adjacent a first end of the occluded portion and that the lagging scene actor is adjacent a second end of the occluded portion.

15. The method of claim 11, wherein determining a first travel distance for the leading scene actor further includes determining that the first travel distance is a distance approximately equal to a car length behind the leading scene actor extending into the occluded portion.

16. The method of claim 11, wherein determining a second travel distance for the lagging scene actor further includes determining that the second travel distance is a distance approximately equal to a car length in front of the lagging scene actor extending into the occluded portion.

17. The method of claim 11, wherein calculating a contracted occluded portion disposed within the occluded portion based on the first and second travel distances corresponding to the leading and lagging scene actors further includes determining that the contracted occluded portion has a first end and a second end, wherein the first end of the contracted occluded portion is defined by the first travel distance of the leading scene actor and the second end of the contracted occluded portion is defined by the second travel distance of the lagging scene actor.

18. The method of claim 11, further comprising determining whether one of the plurality of candidate trajectories intersects the contracted occluded portion and assigning a score for each of the plurality of candidate trajectories, wherein assigning the score of the one of the plurality of candidate trajectories that intersects the contracted occluded portion is a first score and another of the plurality of candidate trajectories that does not intersect the occluded portion is assigned a second score.

19. The method of claim 18, wherein scoring the plurality of candidate trajectories further includes determining that the one of the plurality of candidate trajectories that intersects the contracted occluded portion is assigned the first score that is lower than the second score in response to determining that the one of the plurality of candidate trajectories intersects the contracted occluded portion and the other of the plurality of candidate trajectories does not intersect the occluded portion.

20. The method of claim 19, further comprising selecting the one of the plurality of candidate trajectories based on the assigned score.

\* \* \* \* \*